April 25, 1933.                J. A. BURNER                1,905,263
PROCESS AND APPARATUS FOR PRODUCING DEHYDRATED PRODUCTS
Filed Oct. 2, 1930
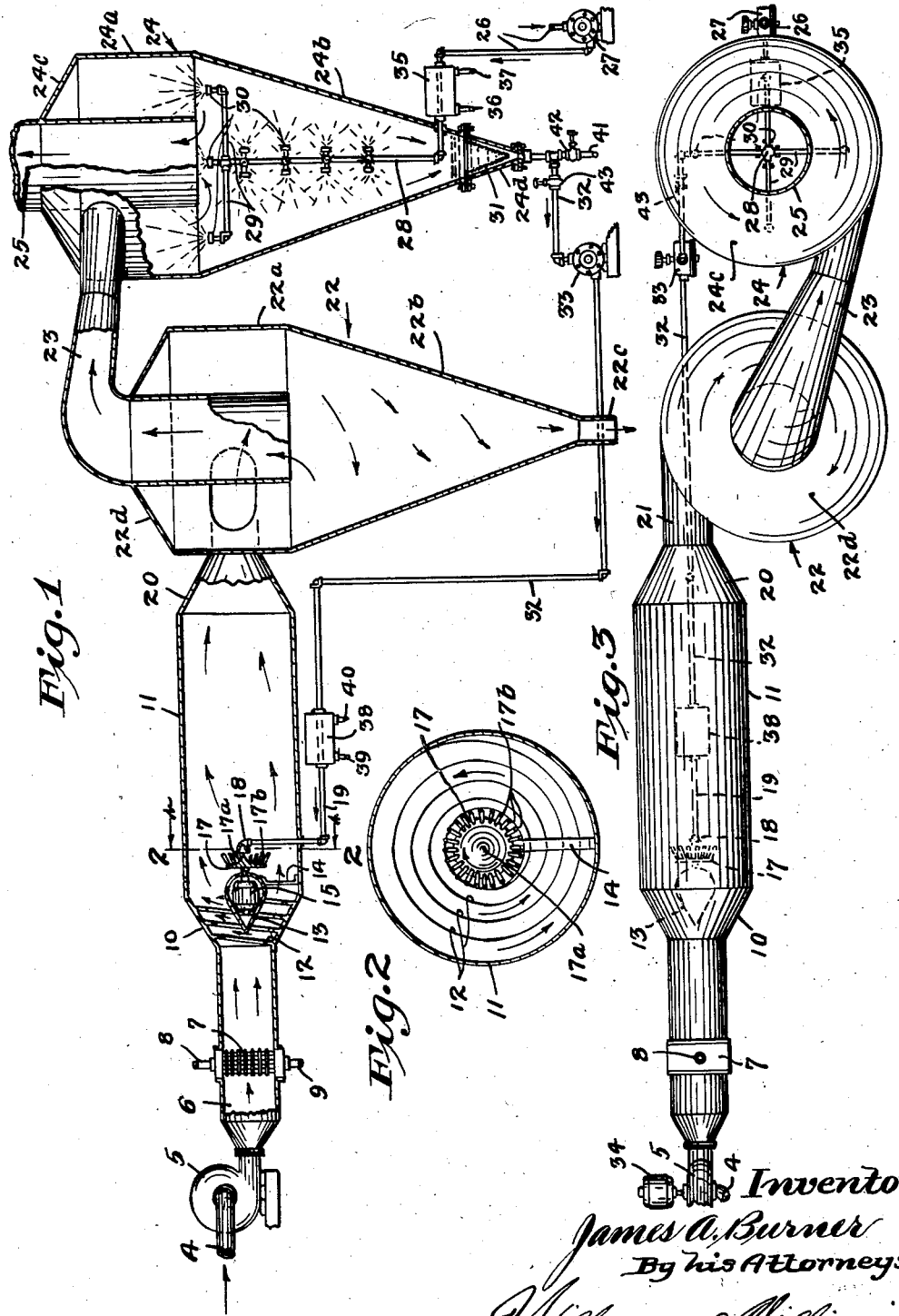
Inventor
James A. Burner
By his Attorneys
Williamson & Williamson Patented Apr. 25, 1933

1,905,263

UNITED STATES PATENT OFFICE

JAMES A. BURNER, OF MINNEAPOLIS, MINNESOTA, ASSIGNOR TO AIR SYSTEMS INCORPORATED, OF MINNEAPOLIS, MINNESOTA, A CORPORATION OF MINNESOTA

PROCESS AND APPARATUS FOR PRODUCING DEHYDRATED PRODUCTS

Application filed October 2, 1930. Serial No. 485,904.

This invention relates to processes and apparatus for dehydrating various products and particularly milk.

It is the main object of the present invention to provide novel and efficient processes, and novel and efficient apparatus for carrying out the processes, which will produce dried and condensed milk and other dehydrated and particularly dehydrated products without scorching or burning the same.

To these ends the invention consists in the novel processes and steps in the processes and the novel parts and combinations of parts hereinafter defined in the claims and described in the following specification, made in connection with the accompanying drawing, wherein like reference characters refer to the same or similar parts throughout the various views and, in which, Fig. 1 is a view taken chiefly in vertical section but partly in side elevation through a complete apparatus embodying my invention and used for carrying out my processes;

Fig. 2 is a vertical section taken on the line 2—2 of Fig. 1, as indicated by the arrows; and Fig. 3 is a plan view of the apparatus illustrated in Fig. 1.

The apparatus illustrated will be first described and the processes will then be described in connection with the apparatus shown. Although various liquid products and other products containing a high percentage of water or other liquids can be dehydrated, the apparatus and processes will be first described as used for producing dried and condensed milk.

Referring to the drawing, there is illustrated an air conduit 4 leading into the eye of a blower 5, operated by means of a variable speed electric motor 34 or any other suitable variable speed source of power and discharging into the rear end of a conduit 6. Within the conduit 6 there is mounted a heater 7 illustrated as being a radiator to which a heating medium may be supplied through a pipe 8 and may be discharged through a pipe 9, the heating medium being heated from any source (not illustrated).

The conduit 6 is connected at its forward end to a truncated conical section 10 at the rear or receiving end of a horizontal drum 11. The conical section 10 is provided with helical vanes 12 or equivalent air whirling means to produce a whirl in the air in a certain direction charged into the drum 11 from the conduit 6. A divider casing 13 of conical shape at its rear end and of curved partially spherical shape at its forward end is centrally supported within section 10 as by support 14, and mounted within this casing is preferably a variable speed electric motor 15 having a motor shaft 16 extending forwardly into the drum 11 through the casing 13 and carrying at its forward end a rotary distributor 17. It will of course be understood that the shaft 15 may be driven by any suitable but preferably variable speed source of power located either within or without divider casing 13. The distributor 17 may be of any desired type to divide the milk, other liquid or other products charged to the nozzle into small particles and to produce a whirling action of the small particles of the same while moving the same forwardly in drum 11. The type of distributor 17 illustrated is probably as simple as could be provided for successful use. The distributor 17 illustrated has a central forwardly projecting divider portion 17a and from the peak of this divider portion, the forward surface of the distributor is concavely curved inwardly and toward the circumferential edge of the same. Adjacent the circumferential edge of the distributor there are provided a plurality of spaced pins 17b which project forwardly and outwardly from the edge of the distributor. Directly ahead of the divider portion 17a of the distributor, there is mounted a discharge outlet 18 of a supply conduit 19 for supplying the liquid or other products to be treated to the distributor 17. The supply conduit 19 is shown in the drawing as being a liquid supply conduit particularly adapted for supplying milk to the distributor 17 but any suitable conduit for supplying either liquid or disintegrated partially solid products, such as potatoes, corn etc. may be substituted for the conduit 19 shown. The outlet 18 of the conduit 19 charges the product to be treated directly onto the divider portion 17a of distributor 17 where the product is divided into streams and carried by the centrifugal force of the rotating distributor and by the concavely curved surfaces thereof to the pins 17b. As the distributor 17 will be rotated at high speed from the motor 15, the pins will act to break up the product into small particles and to produce a strong whirling action of these particles. The motor shaft 16 will be so actuated that the nozzle 17 will rotate in an opposite direction to the direction of whirl of the air produced by the air whirling means 12 and the whirling particles although they are projected generally forwardly through the drum 11 in the same general direction as the air running therethrough, will be whirled in an opposite direction relative to the direction of whirl of the air. The drum 11 has at its forward end a second truncated conical section 20 connected to a conduit 21 which leads tangentially into a cyclone collector 22. The cyclone collector 22 has a cylindrical portion 22a adjacent its upper end into which the conduit 21 extends and a funnel-shaped portion 22b extending downwardly from the cylindrical portion 22a and terminating in a collecting nozzle 22c at its lower end. Above the cylindrical portion 22a the cyclone collector has an upwardly and centrally flaring portion 22d to which a conduit 23 is connected, the conduit 23 projecting downwardly in the collector and terminating at a point about level with the lower part of the cylindrical portion 22a. The conduit 23 extends to a second casing 24 forming a wet condenser and preferably disposed slightly above the cyclone collector 22 and of a shape very similar to the said collector. The casing 24 has a cylindrical portion 24a, a funnel-shaped portion 24b and an upwardly and centrally flaring portion 24c shaped very similar to the portions 22a, 22b and 22d respectively of the cyclone collector 22. The outlet portion of the conduit 23 leading to the wet condenser is disposed substantially tangentially relative to the cylindrical portion 24a of the same. Extending from adjacent the lower edge of the cylindrical portion 24a upwardly and through the upper end of the casing 24 is a large tubular conduit 25 which leads off to the atmosphere. A conduit 26 leading from any suitable source of liquid supply such as a source of milk supply, extends to a small liquid pump 27 and thence to a heater 35 having pipes 36 and 27 connected thereto and supplying and discharging a heating medium to the heater. The conduit 26 is preferably extended to a radiator or coil within the heater 35 and is thence carried within the wet condenser 24 to a point adjacent the lower end of the conical portion 24b thereof. The conduit 26 is connected to a vertical pipe 28 extending upwardly in the casing 24 to a point slightly below the inner end of the tubular conduit 25 and this pipe 28 is connected to two or more horizontal pipes 29 which extend radially from the pipe 28 to points between the cylindrical portion 24a and the tube 25. A plurality of spray nozzles 30 are applied to the vertical pipe 28 and to the ends of the pipes 29 and these nozzles are so arranged that when a liquid product is supplied through conduit 26 to the pipes 28 and 29, all inner surfaces of the casing 24 will be sprayed with the liquid. The lower end of the casing 24 is provided with a small funnel-shaped detachable section 24d within which a funnel-shaped strainer is disposed in spaced relation from the walls thereof. A conduit 32 is connected to the lower end of the section 24d below the strainer 31 and runs to a rotary liquid pump 33 and thence to a heater 38 having conduits 39 and 40 respectively for the admission and discharge of a heating medium thereto. The conduit 32 adjacent its point of connection with the removable section 24d of the wet condenser, has a branch pipe 41 leading downwardly therefrom controlled by a valve 42. Another valve 43 is applied in the conduit 32 toward the pump 33 from the branch pipe 41. When the device is used for dehydrating milk and similar liquids, the supply conduit 19 is connected to a coil or radiator situated within the heater 38 and to which the conduit 32 leads.

In using the apparatus for producing dried milk and similar dried products derived from liquid, the blower 5 or an equivalent air forcing means will be set in operation, heating mediums will be supplied to the radiator 7 or an equivalent air heating means in the conduit 6 and also to the heaters 35 and 38. The motor 15 will also be set in operation and the two liquid pumps 27 and 33 will also be operated. Valve 42 will be closed and valve 43 will be opened. The liquid such as milk to be dried will be supplied through the conduit 26 to the liquid pump 27 and thence through the heater 35 to the pipes 28 and 29. If milk is being used, the milk will be sprayed from the nozzles under pressure from the pump 27 into the wet condenser 24 and this milk will be in warm condition due to its passage through the heater 35. The blower 5 will force air at considerable pressure through the conduit 6 and the radiator 7 therein to heat the air, whereupon this air will travel through the drum 11 and the cyclone collector 22 and thence through the conduit 23 into the wet condenser 24. This air will take a spiral path within the wet condenser 24 due to the fact that the same is tangentially admitted to the wet condenser and the air will swirl downwardly in the wet condenser 24 to a point below the lower end of the tube 25. The milk sprayed from the nozzles 30 will come in contact with this air and a certain amount of the moisture from the milk will be absorbed from the milk at this time before the air is forced from the wet condenser through the tube 25 into the atmosphere. The milk sprayed from the nozzles 30 will strike all portions of the inner surfaces of the wet condenser 24 to prevent the lodging of particles of the milk on these surfaces and the milk will run downwardly into the lower conical section 24b of the condenser and thence through the strainer 31 and detachable section 24d into the conduit 32. If it is desired to produce merely condensed milk, the valve 43 may be closed and the valve 42 opened, whereupon the milk in condensed condition may be drawn off through the extension conduit 41. If it is desired to produce dried milk, the valve 42 will be closed and the valve 43 opened, whereupon the milk with part of the moisture removed therefrom will pass through the conduit 32 to the pump 33 and thence to the heater 38 under pressure. The temperature of the milk will be raised by the heater 38 and the milk will be discharged through the conduit 19 and the discharge outlet 18 onto the distributor 17.

As the heated air is forced through the tube 6 into section 10 having the air whirling means 12 therein, the air will be divided by the divider casing 13 into an annular stream and a strong whirl, for example, in a counter clockwise direction, as indicated by the arrows Fig. 2, will be produced in this air stream. The centrifugal force of this whirling stream of air will cause the same, as it is introduced into the drum 11, to seek the sides of the drum 11 while running forwardly in the drum. As the warm milk is disengaged from the outlet 18 of conduit 19 on to the distributor 17, the milk will be divided by the peak 17a of the distributor as previously described, and broken up into small particles by the pins 17b. The milk in finely divided condition will then be projected forwardly through the drum 11 in a whirling stream, the direction of whirl being opposite to the direction of whirl of the stream of air. In the drawings Fig. 2, the inner arrow indicates that the direction of rotation of the distributor 17 is clockwise and, accordingly, the fine particles of milk will whirl in a clockwise direction and the body of milk will be centrally located in the drum 11 relative to the air passing therethrough. The air stream will act to insulate the milk stream from the sides of the drum 11 and the milk will not strike the sides of the drum where it would otherwise lodge and burn due to the fact that the drum will be intensely heated by the hot air passing therethrough. The whirls of the air stream and the milk stream being opposed will cause the milk to come into intimate contact with the air and the hot air will quickly take up the moisture from the milk. The hot air will quickly reduce the milk to dried powdered form and the air which will now be quite moist, together with the dry powdered milk, will be carried into the cyclone collector 22 through conduit 21. Attention should here be called to the fact that by varying the relative speed of the two motors 34 and 15 which is possible, due to the fact that these motors are variable speed motors, a stronger or weaker whirling action of the stream of air relative to the stream of finely divided milk can be obtained and the velocity of both the air stream and the milk stream can be varied. It may be desirable at times to increase the speed of the motor 34 relative to the speed of the motor 15 in order that the air stream in its travel through the drum 11 may confine the milk stream more closely to the center of the drum during its movement therethrough, or, on the other hand, it may be desirable to increase the speed of the motor 15 relative to the motor 34, in order that the centrifugal force imparted to the milk particle stream may cause the milk particles to be carried more closely adjacent the sides of the drum, thereby producing a slightly different drying action in the drum 11. It is possible, therefore, to vary the velocity of the stream of the air in the drum 11 and the stream of finely divided milk or other product that is being dehydrated to obtain the most efficient drying action between the two streams as they pass through the drum 11 without permitting the product being dehydrated from scorching due to contact with the walls of the drum.

As the moist air and dry powdered milk is carried into the cyclone collector 22, the milk and air will whirl downwardly within the collector below the lower edge of the conduit 23 and the dried powdered milk will drop into the funnel-shaped portion 22b of the collector, due largely to the fact that the pressure in the collector will be considerably lower than the pressure in the drum 11. The difference in pressure between the drum 11 and the collector 22 is occasioned largely by reason of the size of the chamber formed by the collector and also by reason of the fact that the conduit 21 is constricted at a point adjacent the collector 22. The dried powdered milk dropped in the collector 22 will run downwardly through the nozzle 22c where it can be caught in suitable containers. At the time the milk and air enter the cyclone collector 22, all of the milk will be in dried powdered form. The major portion of this milk will be collected in the collector 22 and discharged through the nozzle 22c. However, a certain small proportion of the powdered milk will not drop from the air in the cyclone collector 22. The moist air and unseparated milk in the collector will be carried out through the conduit 23 far removed from the point where the powdered milk is collected in the bottom of the collector. Accordingly, the air will not act to again moisten the dry, collected milk and a very efficient separating action between the air and the milk is obtained. The air with whatever milk there is, that has not been collected in collector 22, will be carried through conduit 23 into the wet condenser 24. This air and milk will be introduced into the casing 24 in a stream extending tangentially relative to the cylindrical portion 24a of the casing and it will whirl downwardly through the casing to come in contact with the fresh milk discharged from the spray nozzles 30. This fresh milk will absorb all the dry milk that the air admitted to the wet condenser 24 contains and no milk will be carried out from the wet condenser into the atmosphere through the tube 25. The position of the nozzles 30 connected to the horizontal pipes 29 assures contact between the fresh milk and the powdered milk before the air can be discharged from the wet condenser. The dry milk not collected in the collector 22 will, accordingly, be run through the apparatus again with the fresh milk supplied thereto. Whatever heat there is that is left in the air as it is admitted to the wet condenser will be utilized to add heat to the milk in the wet condenser. The air as it passes from the tube 25 will be completely or almost completely saturated with moisture.

It will be seen that none of the milk or other liquid products that may be operated upon will be wasted by use of the present processes and apparatus. It is found that when milk is dehydrated and the air from the blower 5 is travelling at a velocity of one inch water glass pressure and the temperature of the air as it is admitted to the drum 11 is between 250 and 300° F., that about 65% of the milk will be collected in dried powdered form by the collector 22. The remaining milk is collected by the wet condenser and again run through the apparatus. When partially solid products are dehydrated by the present apparatus, the wet condenser 24 will not be used or if used, the pump 27 and heater 35 will not be set in operation. Preferably a slightly different type of wet condenser will be provided when partially solid products are dehydrated and different means will be used for supplying the products to the distributor 17 than the means shown and described.

My novel process of introducing heated air in a swirl into the drum 11 surrounding the swirl of finely divided milk or other product being dehydrated, effectively prevents the dehydrated product from becoming burnt and the burnt taste so often found in dehydrated products is lacking in mine. The efficiency of the apparatus is largely due to the use of the cyclone collector 22 wherein the moist air is discharged from the collector to a point away from the point where the dehydrated product is collected. Practically any product having an evaporative moisture content can be dehydrated by use of my processes and apparatus.

It will, of course, be understood that various changes may be made in the form, details, arrangement and proportions of the various parts of the apparatus without departure from the scope of the present invention and that various changes may be made in the processes and in the steps in the processes without departure from the scope of the present invention.

What is claimed is:—

1. A dehydrating apparatus having in combination, a blower, a drum into the rear end of which said blower leads, air whirling means in the rear end of said drum, a divider centrally disposed in said drum relative to said air whirling means and in the path of the air to deflect the air and divide the same into an annular stream, a rotary distributor disposed ahead of said divider in said drum, and facing toward the forward end of the drum, means for supplying the product to be dehydrated to said distributor, means for rotating said distributor in a direction generally opposite the direction that said air will be whirled by said air whirling means, and a collector connected to the forward end of said drum.

2. The process of producing a dehydrated product which consists in passing air in a whirling stream through a drum and at the same time rotating a body of liquid product to break it up into a stream having a multiplicity of small particles moving under centrifugal force tangentially relative to a central longitudinal axis and introducing said particles into said drum in inner concentric relation to said air stream in such manner that the product particle stream is projected in the same general longitudinal direction through the drum as the air stream but the general centrifugal direction of the movement of the particle stream is opposed to the direction of whirl of the air stream thereby causing the air stream to act as an envelope to confine the hydrated particles of the product to prevent contact between the same and the sides of the drum until the particles have been completely dehydrated.

3. A dehydrating apparatus having in combination a drum, means for introducing air in a whirling forwardly moving stream into the rear end of said drum, a divider centrally disposed in said drum adjacent its rear end and deflecting the air to divide the same into an annular stream, and means for introducing a forwardly moving oppositely whirling stream of small particles of the product to be dehydrated into the drum ahead of said divider, and a collector connected to the forward end of said drum.

In testimony whereof I affix my signature.

JAMES A. BURNER.